(12) United States Patent
Feinauer et al.

(10) Patent No.: US 10,861,483 B2
(45) Date of Patent: Dec. 8, 2020

(54) PROCESSING VIDEO AND AUDIO DATA TO PRODUCE A PROBABILITY DISTRIBUTION OF MISMATCH-BASED EMOTIONAL STATES OF A PERSON

(71) Applicant: i2x GmbH, Berlin (DE)

(72) Inventors: Christoph J. Feinauer, Berlin (DE); Claudio V. Martay, Berlin (DE); Samuel F. J. Brown, Berlin (DE)

(73) Assignee: i2x GmbH, Berlin (DE)

( * ) Notice: Subject to any disclaimer, the term of this patent is extended or adjusted under 35 U.S.C. 154(b) by 113 days.

(21) Appl. No.: 16/204,437

(22) Filed: Nov. 29, 2018

(65) Prior Publication Data

US 2020/0176018 A1    Jun. 4, 2020

(51) Int. Cl.
*G10L 25/63* (2013.01)
*G06K 9/00* (2006.01)
*G10L 15/22* (2006.01)
*G10L 15/26* (2006.01)

(52) U.S. Cl.
CPC .......... *G10L 25/63* (2013.01); *G06K 9/00335* (2013.01); *G10L 15/22* (2013.01); *G10L 15/26* (2013.01)

(58) Field of Classification Search
CPC ............................ G10L 25/63; G06F 2203/011
See application file for complete search history.

(56) References Cited

U.S. PATENT DOCUMENTS

| | | | |
|---|---|---|---|
| 8,914,285 B2 | 12/2014 | Wasserbat et al. | |
| 9,723,145 B2 | 8/2017 | Bell et al. | |
| 10,622,007 B2* | 4/2020 | Bromand | G06F 3/167 |
| 2011/0141258 A1* | 6/2011 | Song | G06K 9/00281 348/77 |
| 2014/0112556 A1* | 4/2014 | Kalinli-Akbacak | G06K 9/00302 382/128 |
| 2014/0257820 A1* | 9/2014 | Laperdon | G10L 25/63 704/270 |
| 2018/0032126 A1* | 2/2018 | Liu | G06K 9/00302 |
| 2018/0082679 A1* | 3/2018 | McCord | G10L 13/033 |
| 2019/0012599 A1* | 1/2019 | el Kaliouby | G06N 3/04 |
| 2019/0147228 A1* | 5/2019 | Chaudhuri | G06Q 30/0201 382/118 |

(Continued)

FOREIGN PATENT DOCUMENTS

| | | |
|---|---|---|
| EP | 3196879 A1 | 7/2017 |
| WO | 2012009045 A1 | 1/2012 |

(Continued)

*Primary Examiner* — Douglas Godbold
(74) *Attorney, Agent, or Firm* — Hugh P. Gortler

(57) ABSTRACT

A method includes using a computing platform to extract audio and video segments from current video data of a person; apply a first trained supervised machine learning (ML) model to the video segment to produce a first probability distribution of emotional states of the person; and apply a second trained supervised ML model to the audio segment to produce a second probability distribution of the emotional states of the person. The first and second probability distributions are used by the computing platform to produce a third probability distribution of mismatch-based emotional states of the person. The third probability distribution is based on mismatches between the first and second probability distributions.

25 Claims, 6 Drawing Sheets

(56) References Cited

U.S. PATENT DOCUMENTS

2019/0213399 A1\* 7/2019 Yoo .................... G06K 9/00281
2019/0341025 A1\* 11/2019 Omote .................... G10L 25/30
2020/0104670 A1\* 4/2020 Seo .................... G06K 9/00302
2020/0126545 A1\* 4/2020 Kakkar .............. G06K 9/00302

FOREIGN PATENT DOCUMENTS

| WO | 2016111644 A1 | 7/2016 |
| WO | 2017059694 A1 | 4/2017 |

\* cited by examiner

PROCESSING VIDEO AND AUDIO DATA TO PRODUCE A PROBABILITY DISTRIBUTION OF MISMATCH-BASED EMOTIONAL STATES OF A PERSON

Computers are used to monitor human interactions for more effective communication. For instance, computer monitoring helps improve business communications with current and potential customers.

DETAILED DESCRIPTION

Figure 1:
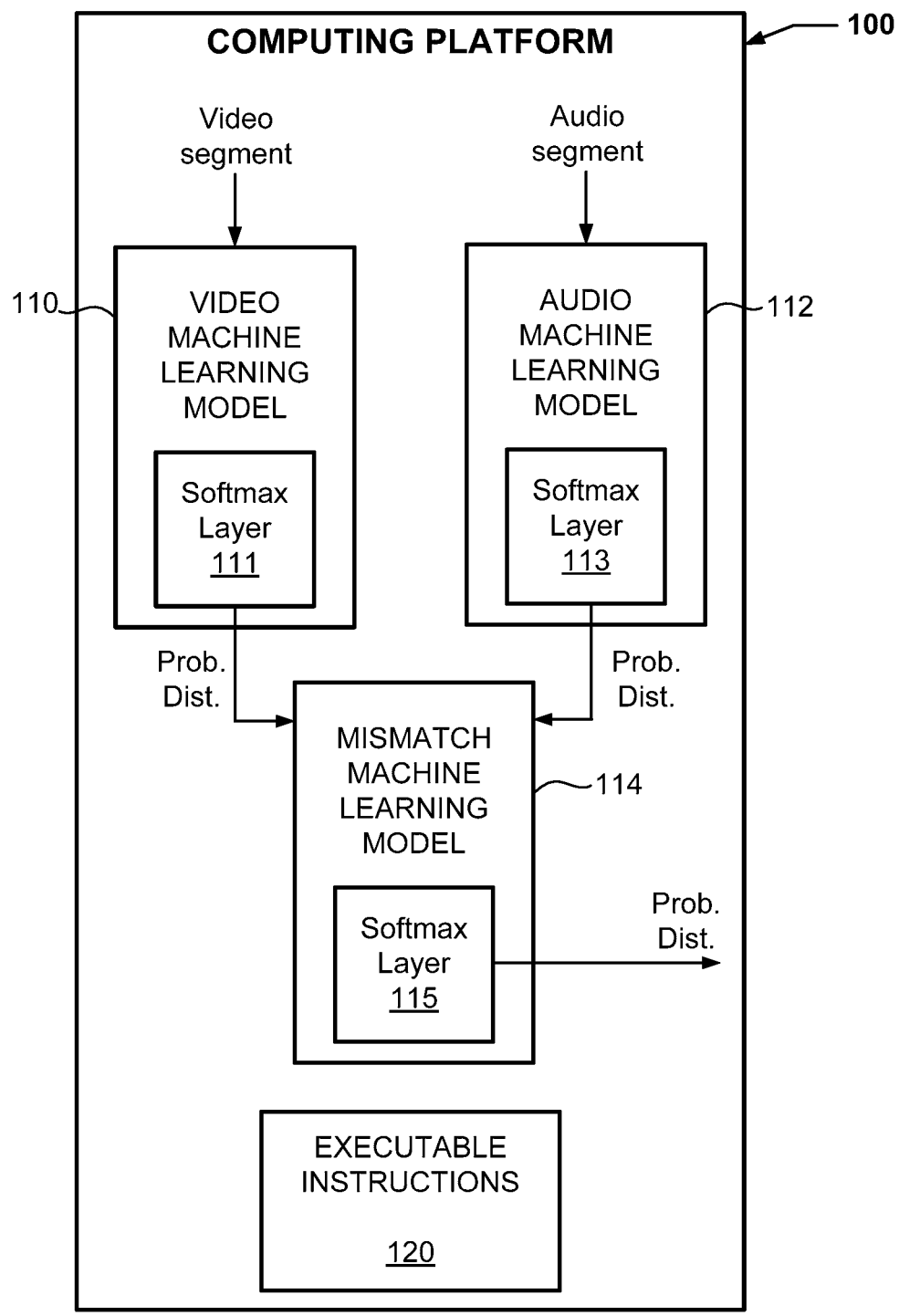
FIG. 1 is an illustration of a computing platform, including trained machine learning models, for determining a probability distribution of mismatch-based emotional states of a person.

Reference is made to FIG. 1, which illustrates a computing platform 100. The computing platform 100 is not limited to any particular type. Examples of the computing platform 100 range from a plurality of servers to a personal computing device such a smart phone, desktop computer, tablet, gaming console, smart watch, laptop computer, and smart headphone set.

The computing platform 100 is capable of capturing video data of a person. The video data may be provided in real time, but it is not so limited. As a first example, digital video data is streamed in real time to the computing platform 100. As a second example, pre-recorded video data is downloaded from a remote source (e.g., a server, a mobile phone) or accessed from a local removable storage device (e.g., a flash drive, an external hard drive).

The video data includes images and audio of a person. Resolution of the images is sufficient to capture certain features (e.g., facial features) of the person.

The computing platform 100 is programmed with the following machine learning (ML) models: a trained video ML model 110, a trained audio ML model 112, and a trained mismatch ML model 114. Each of the trained ML models 110, 112 and 114 may be a trained supervised ML model, such as a neural network. Examples of a neural network include, but are not limited to, a feed forward network, recurrent neural network, neural network with external memory, and a neural network with attention mechanisms.

Each of the trained ML models 110, 112 and 114 is a probabilistic model, which may take the form of a conditional probability model or a joint probability model. The trained ML models 110, 112 and 114 may each have a so called "softmax" layer 111, 113 and 115 or equivalent thereof. In probability theory, an output of each softmax layer 111, 113 and 115 can represent a categorical distribution—that is, a probability distribution over different possible outcomes. Rather than simply outputting a binary indication (e.g., yes/no) of a particular emotional state, each softmax layer 111, 113 and 115 can provide a probability distribution for multiple emotional states.

Each of the trained ML models 110, 112, and 114 has been previously trained on many input-output pairs to create an inferred function that maps an input to an output. For training of the video ML model 110, an input includes prior video data of a person, and an output is a label of an emotional state corresponding to that video data. The video ML model 110 may have been trained to recognize facial features of people in the prior video data and correlate the recognized facial features with certain categories of emotional states. Instead or in addition, the video ML model 110 may have been trained to recognize body language of people in the prior video data and correlate the recognized body language with certain categories of emotional states. When the trained video ML model 110 receives video data as an input during run mode, its softmax layer 111 produces a video-based probability distribution of emotional states.

For training of the audio ML model 112, an input includes prior audio data of a person's voice, and an output is a label of an emotional state corresponding to that voice. During run mode, when the trained audio ML model 112 receives audio data as an input, its softmax layer 113 produces an audio-based probability distribution of emotional states.

The video and audio ML models 110 and 112 are trained on the same categories of emotional states. Examples of categories of emotional states include, but are not limited to, sadness, fear, surprise, love, joy and anger. If the video ML model 110 is trained on these categories, the audio ML model 112 is also trained on these same categories. Thus, the trained video and audio ML models 110 and 112 provide probability distributions of the same emotional states. However, the values of the probability distributions may be different.

The emotional states determined (i.e., classified) by the trained video and audio ML models 110 and 112 are referred to as "underlying" emotional states. These underlying emotional states are used to detect mismatch-based emotional states, which are more complex than the underlying emotional states. Examples of mismatch-based emotional states that are generated from the above-mentioned underlying emotional states (sadness, fear, surprise, love, joy, and anger) include, but are not limited to, sarcasm, exaggeration, boredom, suspicion, authenticity, trust, and insincerity. More generally, complex mismatch-based emotional states result from mismatches in the simpler underlying emotional states.

During training of the mismatch ML model 114, the inputs are prior probability distributions of the underlying emotional states, and the outputs are labels of those mismatch-based emotional states. Thus, the mismatch model 114 is trained to correlate these probability distributions with different mismatch-based emotional states. During run mode, when the trained mismatch ML model 114 receives probability distributions from the video and audio ML models 110 and 112, it produces a probability distribution of mismatch-based emotional states. The mismatch-based probability distribution may be used to classify a mismatch-based emotional state.

The use of probability distributions as inputs to the mismatch ML model 114 (instead of video and audio segments as inputs) results in more efficient emotion classification. There is less data for the computing platform 100 to process. Although the trained mismatch ML model 114 is indirectly using video and audio data as inputs, the inputs to the trained mismatch ML model 114 are broken down into significant features and probability distributions, and do not utilize an entire audio stream or video stream input to produce the mismatch probability distribution. Less data to process can result in faster processing.

The computing platform 100 is further programmed with instructions 120 that, when executed, cause the computing platform 100 to operate in run mode. That is, the executed instructions 120 cause the computing platform 100 to use the trained ML models 110, 112 and 114 to process current video data of a person to produce a probability distribution of mismatch-based emotional states of that person.

Figure 2:
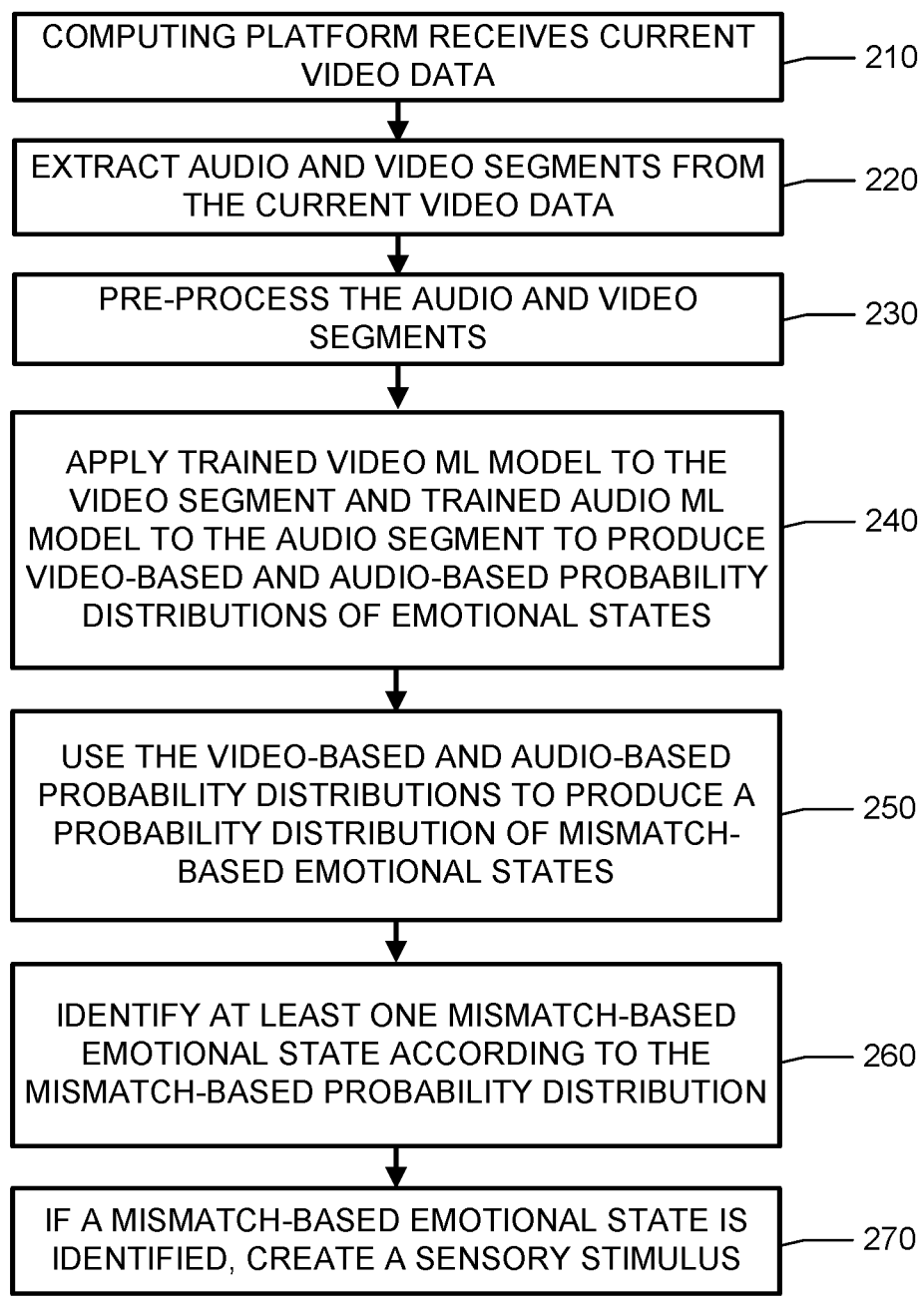
FIG. 2 is an illustration of a method of using the computing platform to determine a probability distribution of mismatch-based emotional states of a person.

Additional reference is made to FIG. 2 which describes a method that the computing platform 100 performs when the instructions 120 are executed. At block 210, current video data of a person is received by the computing platform 100.

At block 220, video and audio segments are extracted from the current video data. These segments may be extracted from the current video data by a commercially available processing tool or open source tool such as FFmpeg.

At block 230, pre-processing is performed on the extracted video and audio segments. Each pixel of a frame of the video segment may constitute an input to the trained video ML model 110. To reduce the number of inputs, a frame may be reduced in size during pre-processing (without losing the ability to detect an emotional state). In addition or in the alternative to reducing frame size, only a portion of a frame may be retained. For instance, a face detection algorithm only extracts features related to strong indicators of an emotional state (e.g., eye brows, corner of a mouth).

Moreover, not all frames need be used. For instance, if a video segment runs three seconds at thirty frames per second, then 90 frames would be available for processing. However, this might be an excessive amount of inputs to process. To ease the computational burden, a rule may be implemented, for instance, to use only a single frame per second.

As for the audio segment, it is transformed from a standard format (e.g., mp3) into a visual representation, which will be processed by the trained audio ML model 112. For example, a spectrogram (a visual representation of the spectrum of frequencies) of the audio segment is created, and features are extracted from the spectrogram. The extracted features are relevant to determining emotional states. Examples of extracted features include, but are not limited to, amplitude, intonation, and length of sounds.

At block 240, the computing platform 100 applies the trained video ML model 110 to the video segment to produce a video-based probability distribution of emotional states of the person. The video-based probability distribution is taken from the softmax layer 111 of the trained video ML model 110.

Also at block 240, the computing platform 100 applies the trained audio ML model 112 to the audio segment (e.g., the features extracted from the spectrogram of the audio segment) to produce an audio-based probability distribution of the emotional states of the person. The audio-based probability distribution is taken from the softmax layer 113 of the trained audio ML model 112.

During run mode, the audio-based and video-based probability distributions may be detected at preset intervals. The length and spacing of the intervals may be determined by the processing capability of the computing platform 100. The more data that is analyzed, the higher the accuracy or fidelity of determining complex emotional states will be. The use of probability distributions, as noted above, increases processing speed, and enables the computing platform 100 to process more data. This, in turn, increases accuracy of determining complex emotional states.

At block 250, the computing platform 100 applies the trained mismatch ML model 114 to the video-based and audio-based probability distributions to produce a mismatch-based probability distribution. The mismatch-based probability distribution is taken from the softmax layer 115 of the trained mismatch ML model 114.

The mismatch ML model 114 compares emotional states across the same category. For instance, a comparison of audio-based and video-based probability distributions show a variation of 0.6 for sadness, minor variations for love and fear, and no variation for the remaining emotional states.

The mismatch ML model 114 also compares emotional states across different categories. For instance, the value for sadness in the video-based probability distribution may be compared to the values for love, fear, surprise, joy and anger in the audio-based probability distribution; the value for love in the video-based probability distribution may be compared to the values for sadness, fear, surprise, joy and anger in the audio-based probability distribution; . . . and the value for anger in the audio-based probability distribution may be compared to the values for sadness, love, fear, surprise, and joy in the video-based probability distribution.

At block 260, the computing platform 100 uses the mismatch-based probability distribution to identify at least one of the mismatch-based emotional states. As a first example, the computing platform 100 identifies only the most likely mismatch based emotional state associated with the current video data. This may be done by selecting the emotional state having the highest probability value.

As a second example, the computing platform 100 displays some or all of the mismatch-based emotional states and their corresponding probability values. The computing platform 100 may also display the underlying emotional states and their video-based and audio-based probability distributions.

At block 270, if a mismatch-based emotional state is identified, the computing platform 100 may create at least one sensory stimulus. As a first example, the computing platform 100 displays a graphical user interface, which changes to a color (or other visible feature), or displays text or a graphic identifying the most likely mismatch-based emotional state. As a second example, the computing platform 100 sounds an audible alarm.

Consider the following example during run mode. Video and audio segments are extracted from current video data, and pre-processed. The trained video and audio ML models 110 and 112 are applied to pre-processed video and audio segments, respectively, and provide the following probability distributions:

|  | Sadness | Love | Fear | Surprise | Joy | Anger |
| --- | --- | --- | --- | --- | --- | --- |
| Audio Segment | 0.3 | 0.1 | 0.5 | 0.6 | 0.1 | 0.5 |
| Visual Segment | 0.9 | 0.2 | 0.7 | 0.6 | 0.1 | 0.5 |

The mismatch ML model 114 is applied to these probability distributions, and produces the following mismatch-based probability distribution:

| Sarcasm | Sincerity | Excitement | Mismatch | Insincerity | Suppression | Boredom |
|---------|-----------|------------|----------|-------------|-------------|---------|
| 0.4 | 0.2 | 0.3 | 0.8 | 0.8 | 0.9 | 0.2 |

The computing platform 100 identifies "suppression" as the most likely mismatch-based emotional state. The computing platform 100 then displays a text message.

In this example, the mismatch ML model 114 has been further trained to identify a "mismatch state" as part of the mismatch-based probability distribution. The mismatch state provides a general indication as to whether a person is exhibiting a mismatch-based emotional state (the other states of the mismatch-based probability distribution identify the specific emotional state(s)).

The mismatch state may be used to reduce processing time. For example, the computing platform 100 identifies a specific mismatch if and only if the mismatch-based probability distribution indicates a high value for the mismatch state. The mismatch state also has value during training, as described below.

The method of FIG. 2 is not limited to any particular usage. Consider the example of video conference between a customer and a sales representative. In this example, the sales representative has access to the computing platform 100, which is also programmed with video conferencing software (e.g., VoIP software). During the video conference, the video conferencing software receives and displays a video stream of the customer. The computing platform 100 performs blocks 220 to 270 to identify the most likely mismatch-based emotional state, if any, of the customer. If there is no mismatch, the computing platform 100 may identify the most likely underlying emotional state. Blocks 220-270 may be performed repeatedly throughout the video conference.

In response to the identified emotional state(s) of the customer, the sales representative can then determine how to modify his or her voice. For instance, if the computing platform 100 indicates that the customer is expressing a perceived emotion of distrust or insincerity during the video conference, the computing platform 100 can notify the sales representative (e.g., by changing color of the graphical user interface), and the sales representative can then take steps to try to gain the confidence of that customer. If the computing platform 100 notifies the sales representative that the customer is expressing a perceived emotion of boredom or disengagement, the sales representative can alter his or her behavior so as not to lose the attention or enthusiasm of the customer.

In addition to determining the most likely mismatch-based emotional state of the customer, the computing platform 100 may also identify the most likely mismatch-based emotional state of the sales representative. The video conferencing software provides a video stream of the sales representative, and the computing platform 100 performs blocks 220 to 270 on that video stream. If the computing platform 100 notifies the sales representative that the sales representative is expressing a perceived emotion of boredom or disengagement, the sales representative can alter his or her behavior in response to the notification.

If the computing platform 100 determines likely mismatch-based emotional states for both the customer and the sales representative, the computing platform 100 can further determine how close the emotional states of both parties are. This is useful for conversations where the emotional state of the sales representative should mirror the emotional state of the customer. Closeness may be determined by comparing the statistical distance of the emotional states of both parties. For example, if the computing platform 100 determines that the customer's value for exaggeration is 0.7 and the sales representative's value for exaggeration at 0.4, the statistical distance is 0.3. The sales representative can then take action to reduce the exaggeration of the customer or increase his or her own exaggeration to mirror the customer's exaggeration.

In the example above, only a single computing platform 100 is used. In the following example, multiple computing platforms 100 are used. In a virtual business meeting involving three participants, each participant uses a computing platform 100. As a result, each participant is provided with guidance about mismatch-based emotional states during the virtual business meeting.

Figure 3:
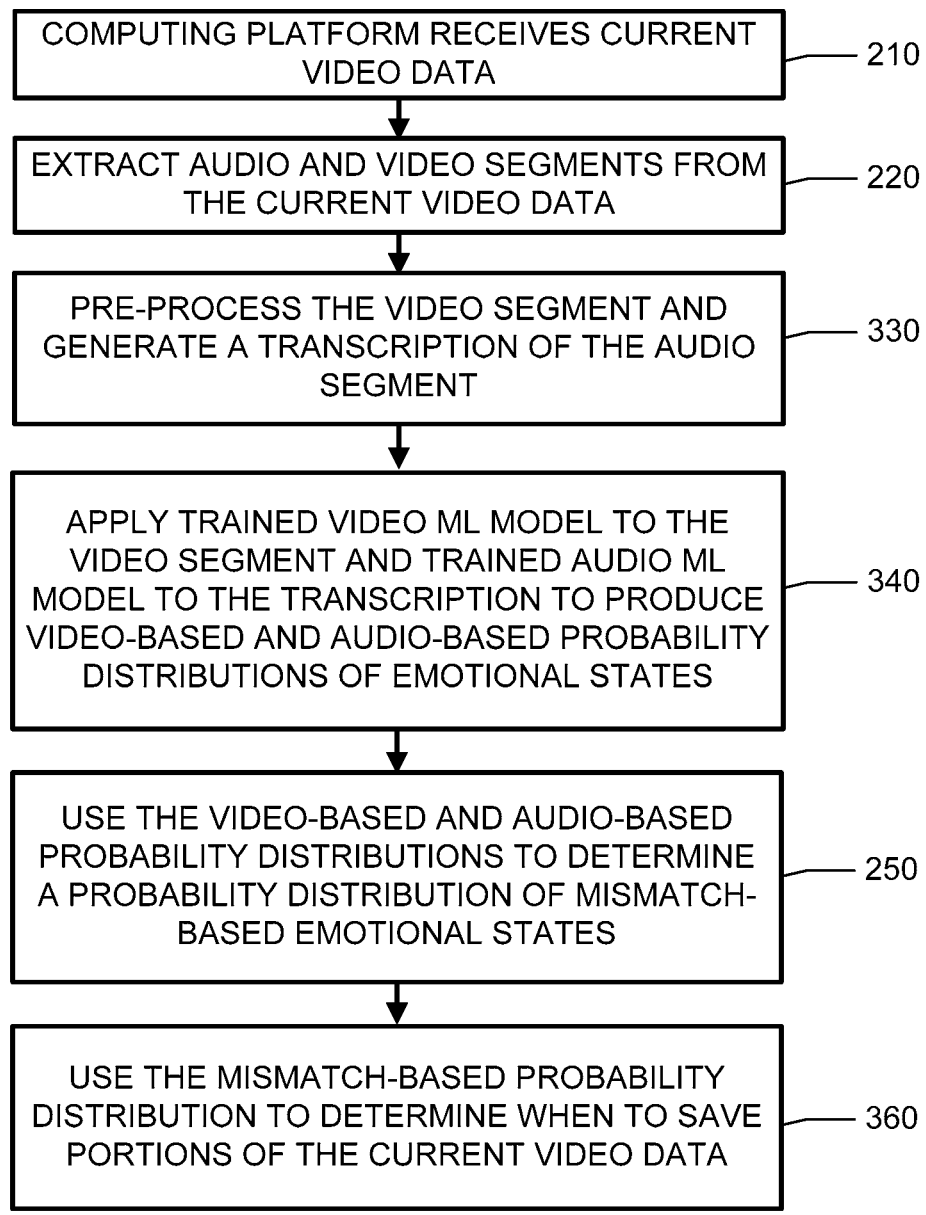
FIGS. 3 and 4 are illustrations of other methods of determining probability distributions of mismatch-based emotional states of a person.

A method herein is not limited the method of FIG. 2. In the method of FIG. 3, the computing platform 100 receives current video data (block 210), and extracts video and audio segments from the current video data (block 220). The computing platform 100 also performs pre-processing on the video segment (block 330). Instead of producing a spectrogram or similar visual representation of the audio segment, however, the computing platform 100 produces a transcription of the audio segment. The transcription may be produced by analyzing the audio segment with an ML model that includes natural language processing (NLP).

The trained video ML model 110 is applied to the video segment, and an audio ML model trained on prior transcriptions is applied to the transcription (block 340). The resulting video-based and audio-based probability distributions are used to produce a probability distribution based on mismatch-based emotional states (block 250).

The mismatch-based probability distribution may be used to determine when to save portions of the current video data (block 360). For instance, the current video data is buffered, and, if a high degree of mismatch is detected, that buffered data is stored. The stored data may be indexed with a mismatch-based emotional state identified in the mismatch-based probability distribution. The stored data may be retrieved at a later date. For example, the stored data may be retrieved days after a video conference has ended to demonstrate how a sales representative was perceived during the video conference.

Figure 4:
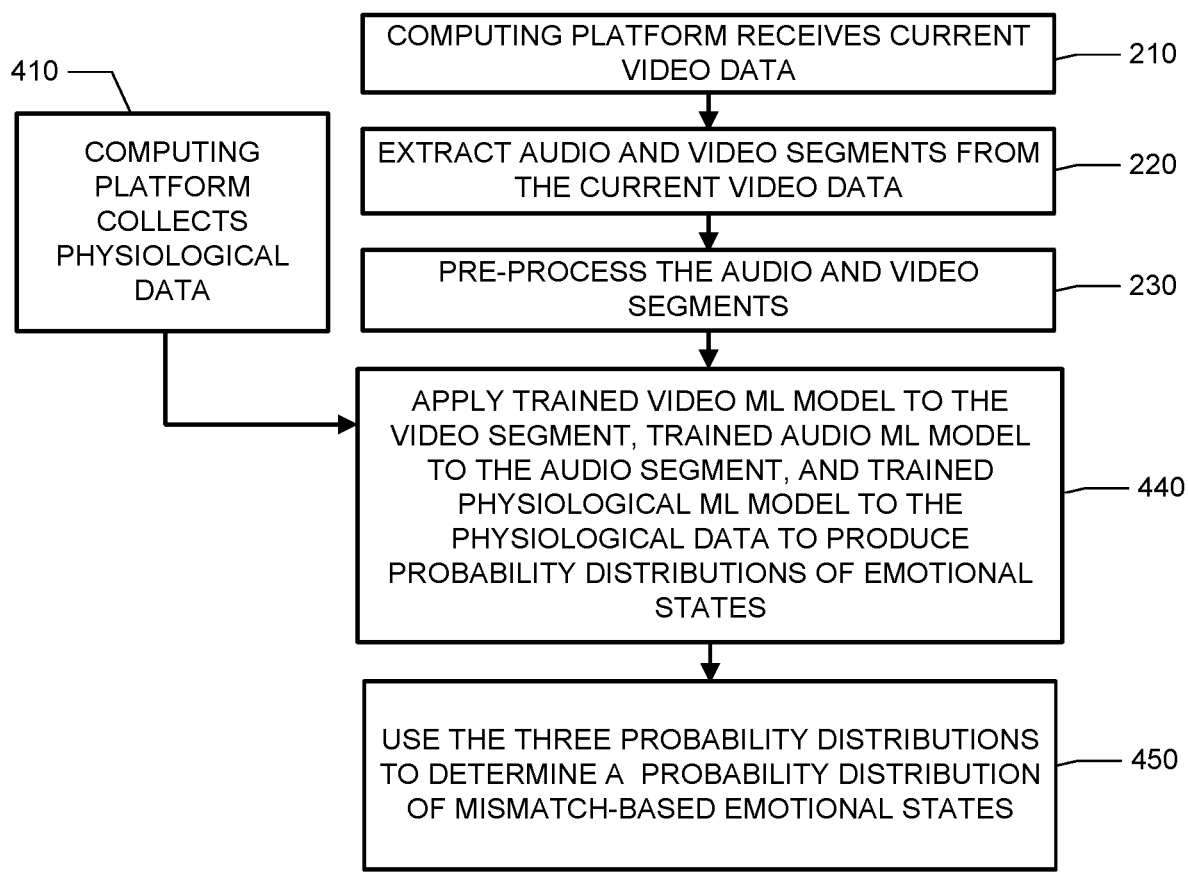

A method herein is not limited only to the use of trained video and audio ML models 110 and 112. In the method of FIG. 4, the computing platform 100 receives current video data of a person (block 210), extracts video and audio segments (block 220), and pre-processes the audio and video segments (block 230). The computing platform 100 also collects physiological data of the person (block 410). The physiological data may include, without limitation, blood pressure, heart rate, heart rate variability, blood oxygen level, breath rate, electrocardiogram (EKG) reading, skin temperature, and skin conductance. The physiological data may also include physiological responses to stimuli such as startle blinks and electrodermal activity, as well as neurological signals including activity levels in different sections of the brain. The physiological data may be obtained by sensors such as skin temperature sensors and infrared cameras. The physiological data may be embedded in the current video data or sent separately.

Trained video and audio ML models 110 and 112 are applied to the video and audio segments to produce video-based and audio-based probability distributions of emotional states of the person (block 440). In addition, a trained physiological ML model is applied to the physiological data (block 440). The physiological ML model had been previously trained on prior physiological data to determine correlations with the underlying emotional states. The underlying emotional states correlated with the physiological data are the same as those associated with the video and audio ML models 110 and 112. The trained physiological ML model also includes a softmax layer, from which a probability distribution is taken.

The three probability distributions produced by the trained video, audio and physiological ML models are used to produce a mismatch-based probability distribution (block 450).

Figure 5:
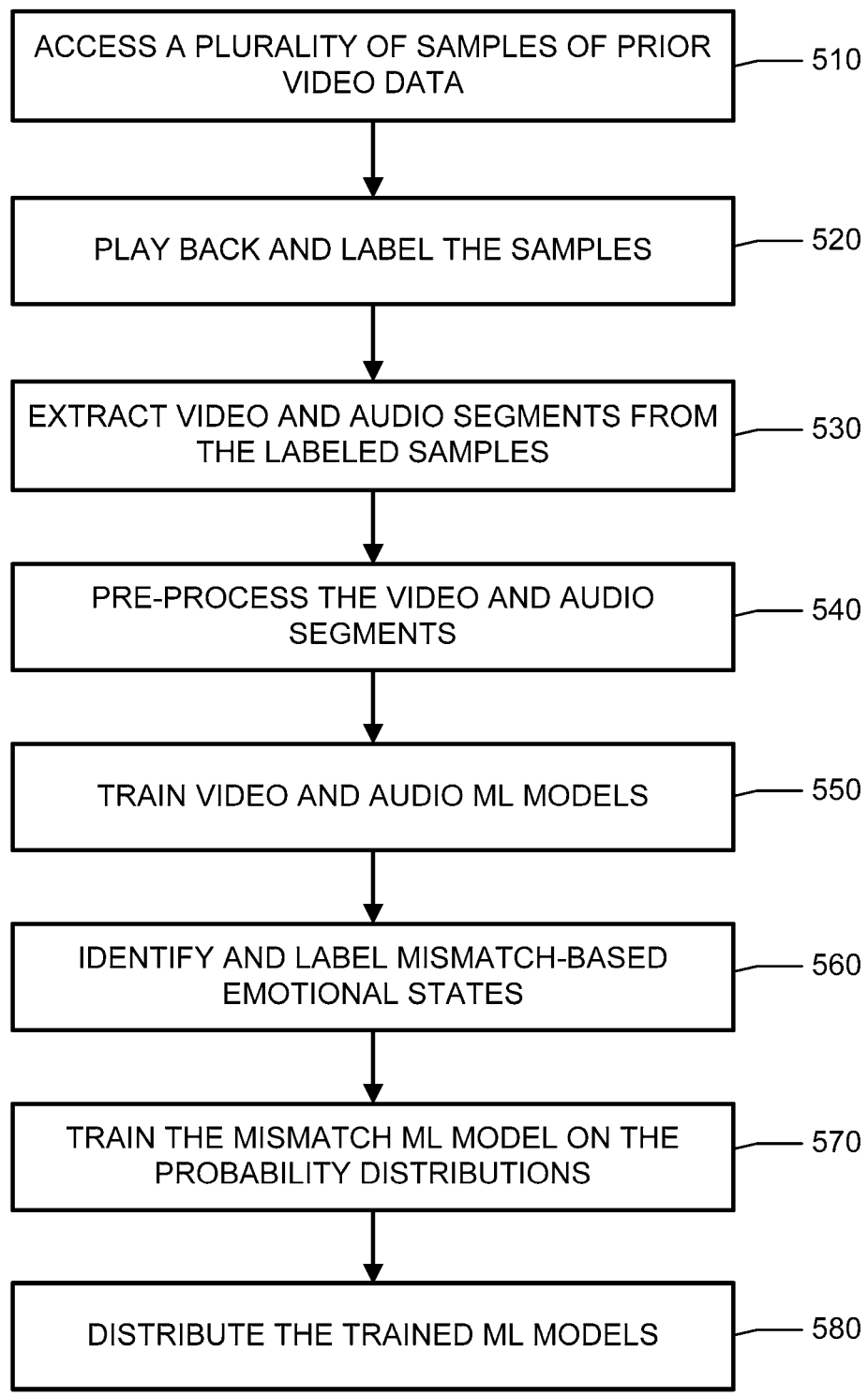
FIG. 5 is an illustration of a method of training the machine learning models of the computing platform of FIG. 1.

Reference is made to FIG. 5, which illustrates a method of training the ML models 110, 112 and 114. At block 510, a plurality of samples of prior video data is accessed. The samples may represent the voices and images of different people. A sample in its entirety may be accessed, or only portion of the sample may be accessed. The samples may be accessed from remote data storage (e.g., a local database, a digital warehouse, a cloud), a streaming service, and local data storage, (e.g., USB drive, a CD).

A set of samples may be unique and distinct so as to produce trained ML models 110, 112 and 114 that are domain-specific. Examples of domains include, but are not limited to, a field of industry, demographic group, and cultural group. However, in some instances, the samples may be taken across multiple domains. For example, the samples may be taken across different fields of industry (e.g., medicine or education).

At block 520, the samples are played back and labeled with underlying emotional states. The labeling may be performed by trained professionals, who view the samples and apply a prescribed set of emotional labels to the samples. Instead of using a prescribed set of labels, trained professionals may be asked to offer their own definitions of the emotional states that they believe are being expressed in the samples.

In some instances, the emotional states displayed in the samples may already be known at the time the samples are accessed. For example, samples of prior video data are retrieved from entertainment multimedia, such as a movie, where an actor is known to be attempting to express an emotion. The known emotional state being expressed by the actor is used as a label.

At block 530, video and audio segments are extracted from the labeled samples. A problem can arise for emotional states that are faster or slower to recognize visually than aurally. In some situations, a person might maintain a poker face, yet reveal emotions through his voice. In still other situations, a person might reveal emotions through facial expressions, yet not say a word. This problem may be overcome by starting to save the segments at a first utterance in the audio segment, and ending the saving as soon as an emotion has been recognized. At the end of extraction, the saved segments will have a length of N frames. The number (N) of frames may be indicative of the emotional state being expressed (some emotions are more or less subtle than others), the length of words expressed in the sample, the emotional intelligence of the person labeling the sample, etc.

At block 540, the video and audio segments are pre-processed. Pre-processing of the audio segments may include creating visual representations, and pre-processing of the video segment may include reducing frame size and number.

At block 550, each of the video and audio ML models is trained. The video segments and their labels provide input-output pairs to the video ML model, and the audio segments and their labels provide input-output pairs to the audio ML model. Preferably, the video and audio ML models are trained on audio and video samples from the same multimedia datasets to ensure that the probability distributions are comparable.

At block 560, mismatch-based emotional states are identified and labeled. The mismatch-based emotional states may be identified and labeled in a variety of ways. Examples include, but are not limited to, 1) using trained professionals to identify mismatch-based emotional states from video and audio segments; (2) showing the video and audio segments to lay people, asking them to determine whether they perceived a mismatch between the audio and video segments, and, if a mismatch is perceived, asking them to apply a label from a prescribed set of emotional labels, 3) showing video and audio segments of a single psychological state to lay people, asking them to label, with a binary option between the thesis and antithesis of the psychological state, and 4) showing video and audio segments and asking the professional or lay person to report the emotion that they think is most likely.

A label for a mismatch state may also be provided. This will enable the trained mismatch ML model 114 to identify a mismatch state.

At block 570, the mismatch ML model 114 is trained on video-based and audio-based probability distributions provided by the video and audio ML models (the inputs) and the labels (the outputs). During training, the mismatch ML model 114 identifies correlations between the combination of probability distributions, and the labels of the mismatch based emotional states. In this manner, simple emotional classifications (e.g., sad angry happy disgust) are used to identify more complex classifications (e.g., sarcasm, mismatch, irony, exaggeration, lying, and truthfulness).

The mismatch state may be used to improve the accuracy of the computing platform 100. Say, for instance, when verifying the mismatch ML model 114 on a test set, the mismatch state repeatedly indicates a mismatch, even though the differences between emotional-based probability values from the video and audio ML models 110 and 112 do not indicate a mismatch, or the mismatch state repeatedly indicates a match, even though the differences between the values produced by the video and audio ML models 110 and 112 indicate a mismatch. These discrepancies may suggest replacement or further training with more input data of the video and audio ML models 110 and 112. If the discrepancies still persist, then replacement or further training of the mismatch ML model 114 could be performed.

At block 580, the trained ML models 110, 112 and 114 may be distributed to the computing platform 100 of FIG. 1. The computing platform 100 stores the trained ML models 110, 112 and 114.

In the method of FIG. 5, all three ML models 110, 112 and 114 are trained on the same data set (that is, the same video and audio segments). However a training method herein is not so limited. For instance, trained video and audio ML models 110 and 112 may be provided by an outside party, who trained the ML models 110 and 112 on a first data set. A second data set is used to train the mismatch ML model. Video and audio segments of the second data set are supplied to the trained video and audio ML models 110 and 112, which generate video-based and audio-based probability distributions. The video-based and audio-based probability distributions are labeled, and the labeled probability distributions are used to train the mismatch ML model 114.

Figure 6:
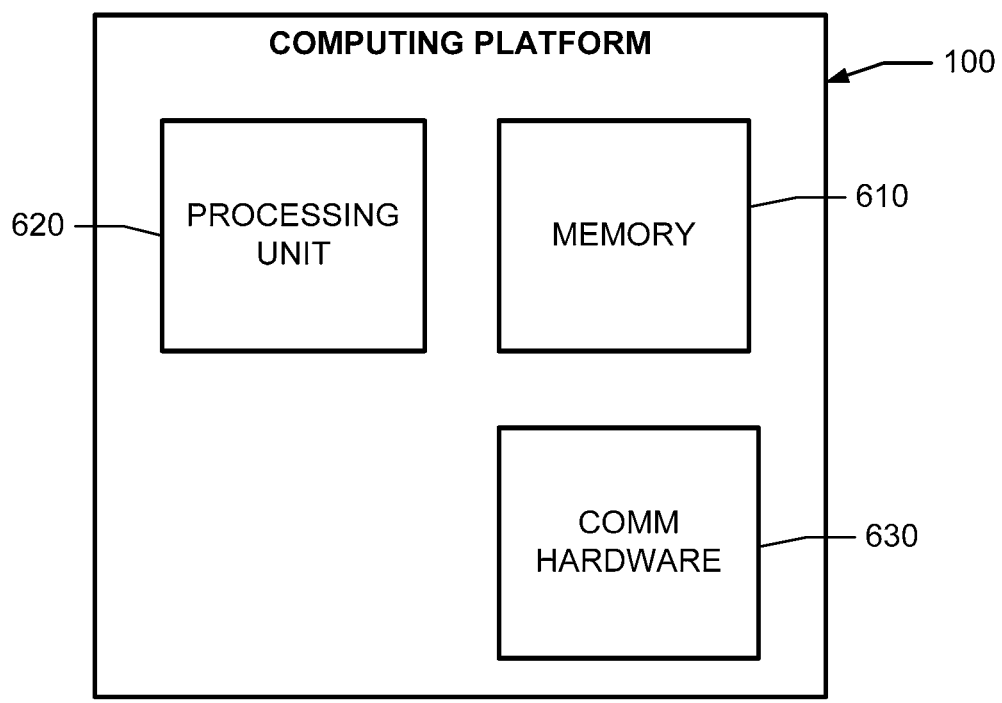
FIG. 6 is an illustration of components of the computing platform.

Reference is now made to FIG. 6, which illustrates an example of components of the computing platform 100. The computing platform 100 includes memory 610 and a processing unit 620. The memory 610 stores the trained ML models 110, 112 and 114, and it also stores the instructions 120 that, when executed, cause the processing unit 620 to use the trained ML models 110, 112 and 114. The memory 610 may also store telecommunications software such as VoIP software. The computing platform 100 may further include communications hardware 630 (e.g., a network interface card, a USB drive) for receiving the trained ML models, the instructions 120, and the current video data.

In some implementations, a single computing platform 100 may train and use the ML models 110, 112 and 114. In other implementations, different computing platforms may be used to train and use the ML models 110, 112 and 114. For example, a first computing platform (e.g., a server system) performs the training of the ML models 110, 112 and 114, and a second computing platform (the computing platform 100 of FIG. 1) receives and uses the trained ML models 110, 112 and 114 and the instructions 120.

The computing platform 100 is not limited to use in real-time video conversations between participants. Other uses include, but are not limited to, recordings of face-to-face conversations, recordings of face-to-audience communications, and security verification. Examples of recorded face-to-face conversations include interviews and meetings. Examples of recorded face-to-audience communications include lectures and performances. In these examples, mismatch based emotional states of speakers and audiences may be identified and recognized for training purposes. In security verification, video of a person may be processed in real time to determine the sincerity of that person.

The invention claimed is:

1. A method comprising using a computing platform to:
   extract audio and video segments from current video data of a person;
   apply a first trained supervised machine learning (ML) model to the video segment to produce a first probability distribution of underlying emotional states of the person, the first ML model having been previously trained on prior video data to determine the first probability distribution;
   apply a second trained supervised ML model to the audio segment to produce a second probability distribution of the underlying emotional states of the person, the second ML model having been previously trained on prior audio data to determine the second probability distribution; and
   use the first and second probability distributions of the underlying emotional states to produce a third probability distribution of more complex mismatch-based emotional states of the person without directly using the extracted audio and video segments, the third probability distribution based on mismatches between the first and second probability distributions.

2. The method of claim 1, wherein using the first and second probability distributions includes applying a third trained ML model to the first and second probability distributions to determine the third probability distribution, the third ML model having been previously trained on input-output pairs, where inputs of the pairs include the emotional states of the first and second probability distributions, and wherein outputs of the pairs include labels of the mismatch-based emotional states.

3. The method of claim 2, wherein the third trained ML model has been further trained to identify a mismatch state.

4. The method of claim 3, wherein each of the first, second and third trained ML models has a softmax layer, and wherein the first probability distribution is taken from the softmax layer of the first trained ML model, the second probability distribution is taken from the softmax layer of the second trained ML model, and the third probability distribution is taken from the softmax layer of the third trained ML model.

5. The method of claim 2, wherein the third trained ML model was trained by supplying a data set to the first and second ML models to produce video-based and audio-based probability distributions, identifying and labeling mismatch-based emotional states from the video-based and audio-based probability distributions, and training the third ML model on the labeled probability distributions.

6. The method of claim 1, wherein the first trained ML model is applied to facial features in the video segment.

7. The method of claim 1, wherein the computing platform is further used to create a spectrogram of the audio segment, and extract audio features from the spectrogram; and wherein the second trained ML model is applied to the extracted audio features.

8. The method of claim 1, further comprising classifying at least one of the mismatch-based emotional states based on values in the third probability distribution.

9. The method of claim 1, wherein the computing platform is further used to create at least one sensory stimulus in response to the third probability distribution.

10. The method of claim 1, wherein the computing platform is further used to produce a transcription of the audio segment, and wherein the second ML model is applied to the transcription instead of the audio segment to determine the second probability distribution.

11. The method of claim 1, wherein the computing platform is further used to obtain physiological data of the person; and apply a third trained ML model to the physiological data to determine an additional probability distribution by correlating emotional states with the physiological data of the person, and wherein the additional probability distribution is also used to produce the third probability distribution.

12. The method of claim 1, wherein the video and audio segments are extracted from the current video data at a first audible utterance in the current video data.

13. A computing platform comprising:
   a communications device for receiving current video data of a person;
   a processor programmed to extract audio and video segments from the current video data;
   a trained supervised video machine learning (ML) model for application to the video segment to produce a video-based probability distribution of underlying emotional states of the person, the video ML model having been previously trained on prior labeled video data to determine the video-based probability distribution;
   a trained supervised audio ML model for application to the audio segment to produce an audio-based probability distribution of the underlying emotional states of the person, the audio ML model having been previously trained on prior labeled audio data to determine the audio-based probability distribution; and a trained supervised mismatch ML model for application to the video-based and audio-based probability distributions of the underlying emotional states to produce a mismatch-based probability distribution of more complex emotional states of the person without directly using extracted audio and video segments.

14. The computing platform of claim 13, wherein each trained ML model has a softmax layer, and wherein the video-based probability distribution is taken from the softmax layer of the video ML model, the audio-based probability distribution is taken from the softmax layer of the audio ML model, and the mismatch-based probability distribution is taken from the softmax layer of the mismatch ML model.

15. The computing platform of claim 13, wherein the processor is programmed to apply the trained video ML model to facial features in the video segment.

16. The computing platform of claim 13, wherein the processor is programmed to create a spectrogram of the audio segment, extract audio features from the spectrogram, and apply the trained audio ML model to the extracted audio features.

17. The computing platform of claim 13, wherein the processor is programmed to classify at least one of the mismatch-based emotional states according to values in the third probability distribution.

18. The computing platform of claim 13, wherein at least one sensory stimulus is created in response to the third probability distribution.

19. The computing platform of claim 13, wherein the communications device also receives physiological data of the person; wherein the processor is programmed to apply a trained physiological ML model to the physiological data to produce a physiological-based probability distribution by correlating emotional states with the physiological data of the person; and wherein the processor is programmed to also use the physiological-based probability distribution to produce the mismatch-based probability distribution.

20. An article for a computing platform, the article comprising memory encoded with first, second and third trained machine learning (ML) models, the first ML model having been trained on prior video data to produce a video-based probability distribution of underlying emotional states, the second ML model having been trained on prior audio data to produce an audio-based probability distribution of the underlying emotional states, the third ML model having been trained on prior video-based and audio-based probability distributions of the underlying emotional states to produce a probability distribution of more complex mismatch-based emotional states without directly using the prior video data and the prior audio data;

the memory further encoded with a plurality of executable instructions, the instructions, when executed, causing the computing platform to extract video and audio segments from current video data of a person, apply the first ML model to the video segment, apply the second ML model to the audio segment, and apply the third ML model to outputs of the first and second ML models instead of the extracted video and audio segments.

21. The article of claim 20, wherein the instructions, when executed, cause the computing platform to apply the first ML model to facial features in the video segment.

22. The article of claim 20, wherein the instructions, when executed, cause the computing platform to create a spectrogram of the audio segment, extract audio features from the spectrogram, and apply the second ML model to the extracted audio features.

23. The article of claim 20, wherein the instructions, when executed, further cause the computing platform to classify at least one of the mismatch-based emotional states on an output of the third ML model.

24. The article of claim 20, wherein the instructions, when executed, further cause the computing platform to create at least one sensory stimulus in response to an output of the third ML model.

25. The article of claim 20, wherein the instructions, when executed, further cause the computing platform to receive physiological data of the person;

apply a trained physiological ML model to the received physiological data to produce a physiological-based probability distribution by correlating emotional states with the received physiological data of the person; and also to apply the third ML model to an output of the physiological ML model, the third ML model having also been trained on prior physiological data.

* * * * *